United States Patent Office 2,963,152
Patented Dec. 6, 1960

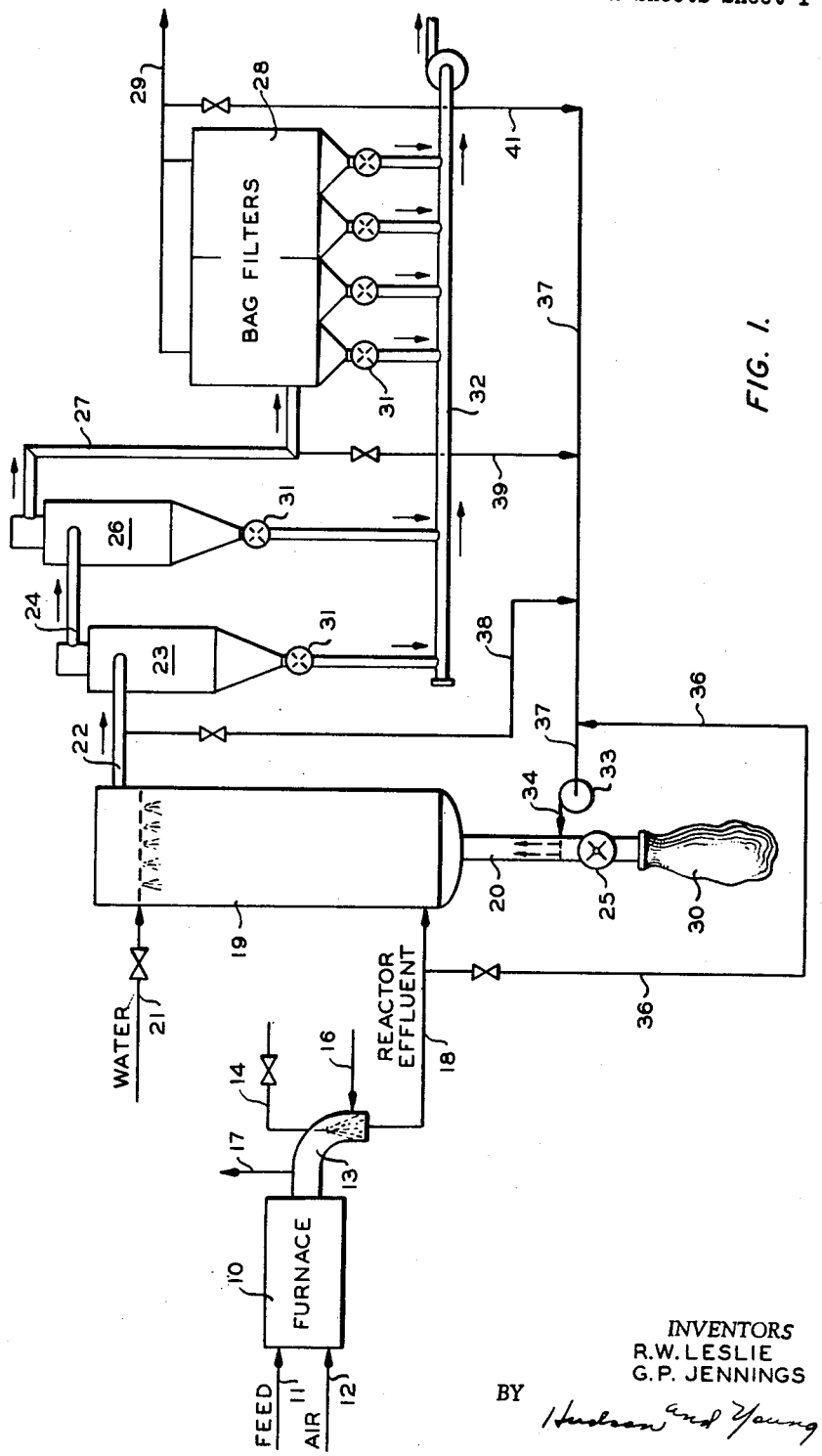

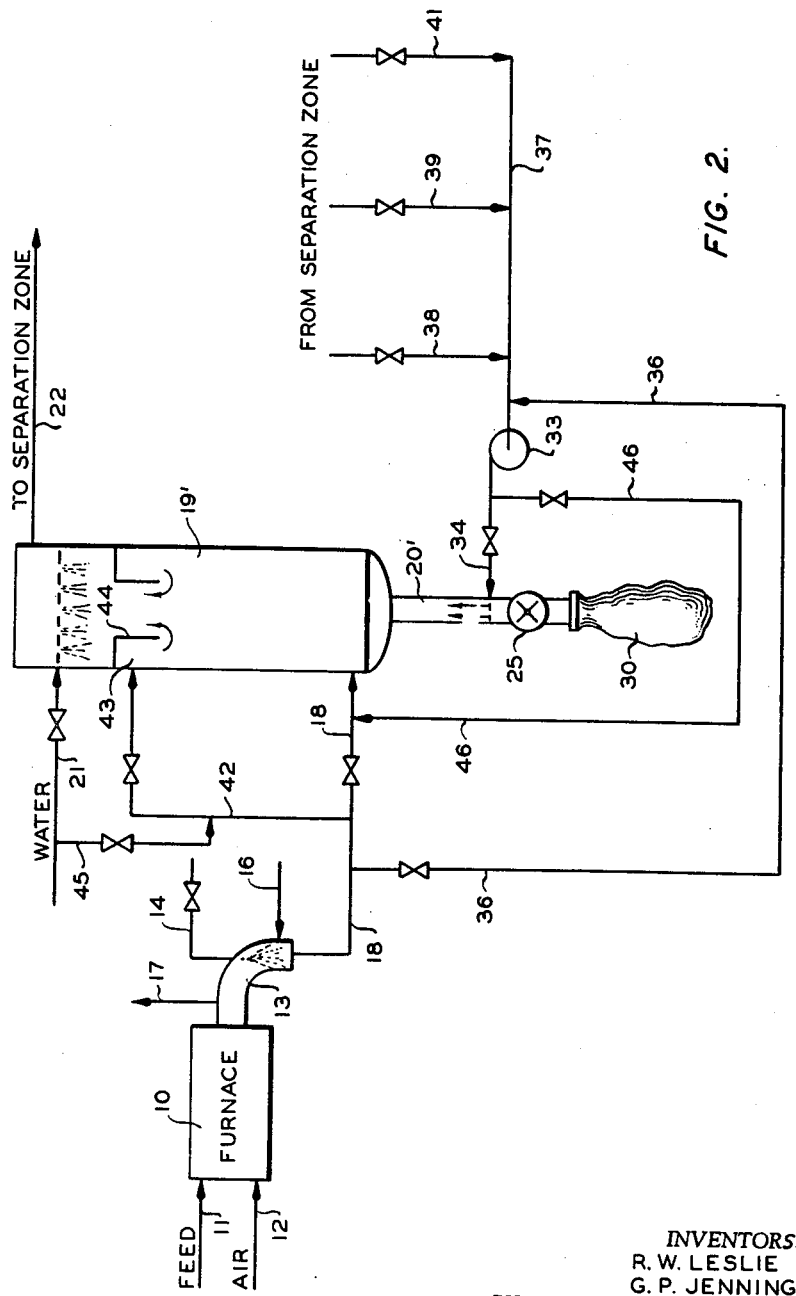

2,963,152

METHOD FOR REMOVING GRIT FROM CARBON BLACK

Robert W. Leslie, Avonmouth, Bristol, and George Peter Jennings, Brentry, Bristol, England, assignors to Phillips Petroleum Company, Bartlesville, Okla., a corporation of Delaware Filed Oct. 28, 1957, Ser. No. 692,855

14 Claims. (Cl. 209—12)

This invention relates to a method, and an apparatus, for removing grit from carbon black.

In the production of carbon black in furnaces, a hot gaseous effluent containing gas, water vapor, and suspended carbon black is produced at temperatures above 210° F., generally coming from said furnace in the neighborhood of 1200° F. although at some points in the furnace during the carbon black making process it may have been at a temperature as high as from 2000° F. to 4000° F. It is extremely difficult to separate the suspended carbon black from the remaining gases and water vapor, especially if this separation is attempted in one step. In many carbon black separation and collection systems the reactor or furnace effluent following a primary quench at the furnace outlet and atmospheric cooling, is further quenched in a secondary quench tower to a temperature in the neighborhood of 500° F. The carbon black is then separated from a second gaseous effluent stream from said secondary quench tower by passing said second gaseous effluent stream through a separation zone comprising electrical precipitators, cyclones, and bag filters.

There is a drop-out of carbon black, grit, and water at the base of said secondary quench tower. Frequently, plugging occurs in the gase of said secondary quench tower and it is difficult to withdraw or remove the material which thus separates out. The material which drops out in the base of said secondary tower contains an appreciable amount of valuable specification quality carbon black. Consequently, in many plants a concrete pit is installed below the secondary quench tower and a slurry is formed by the addition of more water and stirring. Said slurry, after being strained, is then returned to the process as quench liquid in said secondary quench tower by using high pressure pumps. Such a system requires stainless steel equipment throughout in lines, pumps, strainers, spray nozzles, etc. due to the corrosive and erosive nature of the slurry. Plugging of the spray nozzles sometimes occurs in such a system and the previously mentioned problem of plugging at the outlet pipe at the base of the secondary quench tower is also present.

In carbon black production the term "grit" is taken to mean hard or cinder-like particles greater than a predetermined size, usually in the neighborhood of 80–200 mesh, but smaller or greater mesh is sometimes specified. Said grit can be of three types, namely, (1) magnetic material which can be separated by an electromagnet and which results from attrition of metal parts of the reaction system by the carbon black particles and gases, (2) combustible or carbonaceous grit which can be defined as relatively hard aggregates of carbon as distinguished from the flocculent, relatively soft carbon black produced as the desired product, and (3) non-combustible grit resulting from attrition of the refractory parts of the reactor or furnace by the carbon black particles and gases. Users of carbon black have established specifications for maximum content of grit of certain size. For example, where the carbon black is to be used for certain rubber compounding processes the users have established a maximum tolerance for 80 mesh grit of 0.005 weight percent. In other instances, depending upon the use to be made of the carbon black, the grit specifications specify a maximum of 0.01 weight percent of 200 mesh grit. Thus it is important that said grit be removed from the carbon black product in order to meet the specification established by the users of said product.

We have found that the amount of carbon black which settles out with the grit at the bottom of the secondary quench ower can be decreased by reducing the effective volume at the base of said secondary quench tower. Prior art secondary quench towers have been equipped with a cone-shaped base below the point of introduction of the gaseous effluent from the reactor or furnace. Said cone-shaped base provides a quiescent zone of relatively large volume in which the temperature is lower than in the remainder of the tower which results in condensation of water and which also permits the carbon black particles to settle on the sides of the cone. Thus, in accordance with our invention we replace the cone-shaped bottom of the secondary quench tower with an elongated tube of uniform and relatively small diameter or restricted cross section as compared to the diameter or cross section of the secondary quench tower.

We have also found that the amount of carbon black which is lost or settles out with the grit in the base of the secondary quench tower can be further reduced by introducing a stream of elutriating gas into said tube of restricted cross section and/or into the lower portion of said quench tower below the point of introduction of the main stream of furnace effluent.

An object of this invention is to provide an improved method and apparatus for the production of carbon black. Another object of this invention is to provide an improved method and apparatus for the separation of grit from carbon black. Still another object of this invention is to increase the recovery of carbon black from a carbon black producing process by reducing the amount of carbon black which is normally lost or settles out with the grit. Other aspects, objects, and advantages of the invention will be apparent to those skilled in the art in view of this disclosure.

Figure 1 is a diagrammatic elevation of a carbon black manufacturing plant illustrating several embodiments of the present invention.

Figure 2 is a diagrammatic elevation of a carbon black producing plant illustrating other embodiments of the present invention.

Referring now to the drawings wherein like reference numerals are employed to denote like elements, the invention will be more fully explained. In Figure 1 a carbon black furnace, generally designated as 10, can be any of the many types of carbon black furnaces which produce a hot gaseous effluent containing gas, water vapor, and suspended carbon black at a temperature above 210° F. Said furnace may produce the carbon black from any carbonaceous material, usually gaseous or liquid hydrocarbons shown entering as feed from conduit 11, by any one of a number of pyrochemical processes such as exposure to radiant heat alone, incomplete combustion of the feed, or exposure to hot combustion gases with or without partial incomplete combustion with added free oxygen containing gas, such as air, introduced through conduit 12. Said furnace 10 may, if desired, include a primary quench section 13 since in some processes the quality of the carbon black is improved by stopping the reaction more or less rapidly with a direct water spray injection. Often, temperatures of from 2000° F. to 4000° F. may be obtained in said furnace 10 and the reactions there initiated often continue when the temperature of the effluent gas is still above about 1600° F. Quench section 13 may be merely an indirect heat exchange with the atmosphere but in the drawing a direct water spray quench 14 is shown which quenches the effluent rapidly to a temperature of about 1000° F. to 1600° F. and thereby adds water vapor to the gaseous effluent, although generally there is a large amount of water vapor in said effluent even without the use of water spray 14. If desired, there can be indirect heat exchange with cold water entering through conduit 16, passing through a jacket portion of 13, and emerging as warm water or steam through conduit 17.

Gaseous effluent in conduit 18 is therefore generally at a temperature below 1600° F., for example, about 1200° F. This temperature is somewhat hotter than is conductive to long life and proper operation of the usual carbon black separation means and therefore it is conventional to reduce said temperature to the neighborhood of about 600° F. before separation and collection of the carbon black. Said further reduction in temperature can be accomplished by indirect heat exchange with the atmosphere or other fluids while the gaseous effluent is passing through conduit 18 and/or by further direct injection of water spray. When said further injection of water spray is employed, the furnace or reactor effluent is introduced from conduit 18 into the lower portion of a vertically elongated, generally cylindrical, secondary quench tower 19 wherein said gaseous effluent is contacted countercurrently with a downwardly introduced spray of water from conduit 21. A second gaseous effluent stream is withdrawn from the upper portion of quench tower 19 via conduit 22 and passed to a carbon black separation zone.

Said separation zone can comprise a number of carbon black separators. As shown in the drawing the gaseous effluent from quench tower 19 is introduced into primary cyclone 23 wherein a separation of a major portion of the suspended carbon black is effected. Effluent gases from cyclone 23 are passed via conduit 24 into secondary cyclone 26 wherein additional carbon black is separated. Effluent gases from cyclone 26 are passed via conduit 27 to bag filters 28. Gases essentially free of suspended carbon black are withdrawn from said bag filters via conduit 29. Said bag filters can be any of the well-known conventional types of such equipment. In addition to the primary and secondary cyclones illustrated tertiary cyclones can be employed. Also, while not shown in the drawing, it is within the scope of the invention to employ electrical precipitators in the conduit 22 ahead of primary cyclone 23. Thus, herein and in the claims, unless otherwise specified, the term "separation zone" is employed generically and includes any of the various indicated combinations of dry separators.

In the lower portion of each of the separators 23, 26, and 28 there is located a conventional gas lock valve or chemical feeder device 31 which can be a star valve as conventionally shown in the drawings. The carbon black collected in the bottom of each of said separators is passed via the conduits shown into collection conduit 32 from which it is transported to storage. Collection conduit 32 can be a pneumatic conveyor, or a mechanical conveyor such as a screw conveyor. From collection conduit 32 the carbon black is usually passed to a micropulverizer and then to pelleting mills.

Quench tower 19 is preferably a vertically elongated, generally cylindrical vessel. In accordance with the invention there is attached to the base of said tower an elongated tube 20 of uniform and relatively small diameter or restricted cross section as compared to the diameter or cross section of tower 19. Said tube 20 is in communication with the interior of tower 19 and provides a path through which grit and carbon black which settle to the base of tower 19 are withdrawn. Gas lock valve 25 is used to control the withdrawal of said grit and carbon black which is sufficiently dry to be collected in bag 30 for disposal as desired. Bag 30 can be removably attached to tube 20 by any suitable means.

Conventional secondary quench towers of the prior art are provided with cone-shaped bottoms as discussed above. We have surprisingly found, with all other factors remaining unchanged, that when the effective volume in the base of the quench tower is reduced by replacing the cone-shaped bottom of said tower with an elongated tube of restricted cross section, such as tube 20, the amount of grit plus carbon black collected at the base of tower 19 is decreased by about 90 percent while still producing a carbon black product meeting the specification of not more than 0.005 weight percent 80 mesh grit content. Thus, in one embodiment of the invention no elutriating gas is employed in quench tower 19 or tube 20.

The material collected at the base of towers 19 and 19' in tubes 20 and 20' usually contains from 40 to 60 percent of specification quality carbon black. It has been found that from 70 to 80 percent of said specification quality carbon black can be separated from the grit and recovered by the introduction of elutriating gas through conduit 34 into tube 20 or 20' as described herein.

In order to supply elutriation gas to the elongated tube 20 of restricted cross section, blower 33 is provided for the introduction of said elutriation gas via conduit 34. In the practice of the invention said elutriation gas can be a portion of the reactor effluent from conduit 18 and is introduced into blower 33 via conduits 36 and 37. Said elutriating gas can also be a portion of the gaseous effluent withdrawn from the upper portion of quench tower 19 via conduit 22 and introduced into conduit 37 via conduit 38. If desired, said elutriating gas can be withdrawn from an intermediate portion of the separation zone as by conduit 39, or said elutriating gas can be withdrawn from a point downstream of the separation zone as by conduit 41.

Referring now to Figure 2, the gaseous effluent in conduit 18 can be introduced into quench tower 19' by means of either conduit 42 or conduit 18. In one presently preferred embodiment of the invention the major portion of said furnace effluent is introduced via conduit 42 into space 43 below baffle 44 in the intermediate portion of said tower 19'. A minor portion of said furnace effluent is then introduced via conduit 18 into the lower portion of said tower 19' as a primary elutriation gas. Thus, in this embodiment of the invention the region within tower 19' between the points of entry of conduits 42 and 18 is a primary elutriation section and the elongated tube 20' of restricted cross section is a secondary elutriation section. Thus, the elutriation gas introduced into tube 20' via conduit 34 is a secondary elutriation gas and can be introduced from any of conduits 36, 38, 39, or 41 as described in connection with Figure 1. This embodiment of the invention is particularly advantageous when it is desired to produce a carbon black product meeting the grit specification of 0.01 maximum weight percent retained on a 200 mesh screen, or more stringent specifications.

In another modification of the invention, all of the furnace effluent can be introduced into quench tower 19' via conduit 42 and the primary elutriation gas can be introduced from any of conduits 38, 39, and 41 via conduit 37, blower 33, and conduit 46. In this embodiment of the invention no secondary elutriation gas is employed in tube 20'.

A downwardly introduced water spray from conduit 21 is employed in tower 19' and a gaseous effluent from tower 19' is withdrawn via conduit 22 and passed to a separation zone as described in connection with Figure 1. Gas streams can be withdrawn through conduits 38, 39, and 41 to supply either primary elutriation gas to conduit 18 or secondary elutriation gas to conduit 34 as described.

Grit content of carbon black is determined by a conventional screening operation and the grit content is measured as the amount retained on a standard screen of given mesh. Typical grit content specifications set by various users of carbon black are given in Table I below.

As will be understood by those skilled in the art the linear velocity of the elutriating gas employed in the elutriating sections of towers 19 and 19' can be adjusted to permit the settling of particles having a density above a predetermined maximum. Said linear velocity can of course be adjusted by controlling the volume of elutriating gas relative to the cross sectional area of the elutriation zone. In practice it has been found advantageous to adjust said linear velocity so as to (1) control the particle size of the grit removed overhead from towers 19 or 19' in order to meet grit content specifications on the final product and (2) control the amount of carbon black removed from the bottom of tubes 20 or 20' in order to avoid loss of valuable carbon black product. Approximate linear gas velocities which can be employed to accomplish these objectives are set forth in Table I below for the grit content specifications there given.

Table I

| Typical grit content specification | | Approximate linear gas velocity @ 600° F., ft. per second |
|---|---|---|
| Screen size mesh | Amount retained, Wt. Percent, max. | |
| 325 | 0.05 | 0.3 |
| 200 | 0.01 | 1 |
| 80 | 0.005 | 3 |
| 30 | 0.005 | 10 |

Obviously intermediate gas velocities can be employed for intermediate grit content specifications. Thus the linear velocity of the elutriating gas employed in the elutriating sections of towers 19 and 19' in the practice of the invention will usually be in the range of 0.3 to 10 feet per second. However, it will be clear to those skilled in the art that higher or lower gas velocities can be employed to meet grit content specifications outside the range set forth above.

As mentioned above the reduction in temperature of the gaseous effluent in conduit 18 can be accomplished by indirect heat exchange with the atmosphere or other fluids while said gaseous effluent is passing through conduit 18. Depending upon atmospheric temperature, the length of conduit 18, the volume of effluent being passed through conduit 18, etc. it is not always necessary to introduce quench water in towers 19 and 19'. Therefore, while the invention has been described as applicable to those systems wherein a secondary water quench is utilized, it is within the scope of the invention to omit the introduction of quench water in towers 19 and 19'. In such instances towers 19 and 19' become primarily grit separators.

It is thus within the scope of the invention to carry out the above described embodiments of the invention without the introduction of quench water into towers 19 and 19'. For example, referring to Figures 1 and 2, in these additional embodiments of the invention no water would be introduced via conduit 21. It is also within the scope of the invention to introduce quench water via conduit 45 into conduit 42 (Figure 2), with or without the introduction of water via conduit 21.

It is to be noted that in all embodiments of the invention the grit is removed prior to collection of the carbon black product.

It is also to be noted that the elutriation gases employed in the elutriating sections of towers 19 and 19' are process or system gases. It is preferred that said elutriation gases be an essentially oxygen-free gas. Air cannot be used because of (1) the explosion hazard and (2) uncontrolled oxidation of the carbon black product. Typical process or system gases in a furnace black process will usually have an approximate composition as follows, depending upon feed stock and processing conditions:

| Component: | Volume percent (dry basis) |
|---|---|
| $CO$ | 9 to 15 |
| $CO_2$ | 4 to 10 |
| $H_2$ | 5 to 17 |
| $CH_4$ | 0.1 to 1.5 |
| $C_2H_2$ | 0.1 to 1.0 |
| $N_2$ | 65 to 75 |

In conduit 18 said system or process gases usually contain from 5 to 30 grains of carbon black per cubic foot of "wet" gases at 400° F. The wet gases can contain up to 25 to 50 volume percent of water vapor.

A presently preferred elutriation gas is the furnace effluent in conduit 18 because no additional load is placed on the separating units in the separation zone.

Various other modifications of the invention can be made, or followed, by those skilled in the art in view of this disclosure. Such modifications are within the spirit and scope of the invention.

We claim:

1. The method of separating grit from carbon black which comprises: passing a first gaseous effluent stream containing suspended carbon black, grit, and water vapor from a carbon black producing furnace into a vertically elongated quench tower of generally cylindrical cross section; downwardly introducing a spray of quench liquid into the upper portion of said quench tower at a point above the point of introduction of said first gaseous effluent stream; withdrawing a second gaseous effluent stream containing gas, water vapor and suspended carbon black from the upper portion of said quench tower at a point above the point of introduction of said quench liquid spray; and withdrawing a stream comprising grit from the bottom of said quench tower directly into and through a path of uniform relatively small cylindrical cross section (as compared to the cross section of said quench tower).

2. The method of separating grit from carbon black which comprises: passing a first gaseous effluent stream containing suspended carbon black, grit, and water vapor from a carbon black producing furnace into a vertically elongated quench tower of generally cylindrical cross section; downwardly introducing a spray of quench liquid into the upper portion of said quench tower at a point above the point of introduction of said first gaseous effluent stream; upwardly introducing a stream of elutriating gas through an elongated path of uniform relatively small cylindrical cross section (as compared to the cross section of said quench tower) directly into the bottom of said quench zone, said gas being introduced at such velocity as to carry upwardly the less dense carbon black particles while permitting the more dense grit particles to settle downwardly through the ascending gas stream; withdrawing a second gaseous effluent stream containing gas, water vapor, suspended carbon black, and substantially free from grit from the upper portion of said quench tower at a point above the point of introduction of said quench liquid spray; withdrawing a stream comprising grit from the bottom of said quench tower directly into the upper end of said path of uniform relatively small cylindrical cross section; and withdrawing grit substantially free from carbon black from the lower end of said path.

3. The method of separating grit from carbon black which comprises: passing a first gaseous effluent stream containing suspended carbon black, grit, and water vapor from a carbon black producing furnace into the lower portion of a vertically elongated quench tower of generally cylindrical cross section; downwardly introducing a spray of water into the upper portion of said quench tower; upwardly introducing a stream of elutriating gas through an elongated path of uniform relatively small cylindrical cross section (as compared to the cross section of said quench tower) directly into the bottom of said quench tower, said gas being introduced at such velocity as to carry upwardly the less dense carbon black particles while permitting the more dense grit particles to settle downwardly through the ascending gas stream; withdrawing a second gaseous effluent stream containing gas, water vapor, suspended carbon black, and substantially free from grit from the upper portion of said quench tower at a point above the point of introduction of said water spray; withdrawing a stream comprising grit from the bottom of said quench tower directly into the upper end of said path of uniform relatively small cylindrical cross section; and withdrawing grit substantially free of carbon black from the lower end of said path.

4. The method of claim 2 wherein said elutriating gas is a portion of said first gaseous effluent stream.

5. The method of claim 2 wherein said elutriating gas is a portion of said second gaseous effluent stream.

6. The method of claim 2 wherein said second gaseous effluent stream is passed through a carbon black separation zone to separate carbon black therefrom, and said elutriating gas is withdrawn from an intermediate point in said separation zone.

7. The method of claim 2 wherein said second gaseous effluent stream is passed through a carbon black separation zone to separate carbon black therefrom, and said elutriating gas is a portion of a third gaseous effluent withdrawn from the system at a point downstream from said carbon black separation zone.

8. The method of separating grit from carbon black which comprises: passing a first gaseous effluent stream containing suspended carbon black, grit, and water vapor from a carbon black producing furnace into an intermediate portion of a vertically elongated quench tower of generally cylindrical cross section; downwardly introducing a spray of water into the upper portion of said quench tower at a point above the point of introduction of said first gaseous effluent stream; upwardly introducing a stream of elutriating gas through an elongated path of uniform relatively small cylindrical cross section (as compared to the cross section of said quench tower) directly into the bottom of said quench tower, said gas being introduced at such velocity as to carry upwardly the less dense carbon black particles while permitting the more dense grit particles to settle downwardly through the ascending gas stream; withdrawing a second gaseous effluent stream containing gas, water vapor, suspended carbon black, and substantially free from grit from the upper portion of said quench tower at a point above the point of introduction of said water spray; withdrawing a stream comprising grit from the bottom of said quench tower directly into the upper end of said path of uniform relatively small cylindrical cross section; and withdrawing grit substantially free from carbon black from the lower end of said path.

9. The method of separating grit from carbon black which comprises: passing a first gaseous effluent stream containing suspended carbon black, grit, and water vapor from a carbon black producing furnace into an intermediate portion of a vertically elongated quench tower of generally cylindrical cross section; downwardly introducing a spray of water into the upper portion of said quench tower at a point above the point of introduction of said first gaseous effluent stream; introducing a stream of primary elutriating gas into the lower portion of said quench tower; upwardly introducing a stream of secondary elutriating gas through an elongated path of uniform relatively small cylindrical cross section (as compared to the cross section of said quench tower) directly into the bottom of said quench tower; said primary and said secondary elutriating gases being introduced at such velocity as to carry upwardly the less dense carbon black particles while permitting the more dense grit particles to settle downwardly through the ascending gas streams; withdrawing a second gaseous effluent stream containing gas, water vapor, suspended carbon black, and substantially free from grit from the upper portion of said quench tower at a point above the point of introduction of said water spray; withdrawing a stream comprising grit from the bottom of said quench tower directly into the upper end of said path of uniform relatively small cylindrical cross section; and withdrawing grit substantially free of carbon black from the lower end of said path.

10. The method of claim 9 wherein said primary elutriating gas is a portion of said first gaseous effluent stream.

11. In a method of separating grit from carbon black which comprises: introducing a first gaseous effluent stream containing suspended carbon black, grit, and water vapor from a carbon black producing furnace into a vertically elongated grit separation tower of generally cylindrical cross section; withdrawing a second gaseous effluent stream containing gas, water vapor and suspended carbon black from the upper portion of said separation tower and withdrawing a stream comprising grit from the bottom of said separation tower, the improvement of: withdrawing said stream comprising grit directly into and through a path of uniform relatively small cylindrical cross section (as compared to the cross section of said separation tower).

12. The method of separating grit from carbon black which comprises: introducing a first gaseous effluent stream containing suspended carbon black, grit, and water vapor from a carbon black producing furnace into a vertically elongated grit separation tower of generally cylindrical cross section; upwardly introducing a stream of elutriating gas through an elongated path of uniform relatively small cylindrical cross section (as compared to the cross section of said separation tower) directly into the bottom of said grit separation tower, said gas being introduced at such velocity as to carry upwardly the less dense carbon black particles while permitting the more dense grit particles to settle downwardly through the ascending gas stream; withdrawing a second gaseous effluent stream containing gas, water vapor, suspended carbon black, and substantially free from grit from the upper portion of said grit separation tower; withdrawing a stream comprising grit from the bottom of said quench tower directly into the upper end of said path of uniform relatively small cylindrical cross section; and withdrawing grit substantially free from carbon black from the lower end of said path.

13. The method of claim 12 wherein said elutriating gas is a portion of said first gaseous effluent stream.

14. The method of separating grit from carbon black which comprises introducing a first gaseous effluent stream containing suspended carbon black, grit, and water vapor from a carbon black producing furnace into an intermediate portion of a vertically elongated grit separation tower of generally cylindrical cross section; upwardly introducing a stream of primary elutriating gas into the lower portion of said grit separation tower; upwardly introducing a stream of secondary elutriating gas through an elongated path of uniform relatively small cylindrical cross section (as compared to the cross section in said separation tower) directly into the bottom of said grit separation tower; said primary and said secondary elutriating gases being introduced at such velocity as to carry upwardly the less dense carbon black particles while permitting the more dense grit particles to settle downwardly through the ascending gas streams; withdrawing a second gaseous effluent stream containing gas, water vapor, suspended carbon black, and substantially free from grit from the upper portion of said grit separation tower; withdrawing a stream comprising grit from the bottom of said quench tower directly into the upper end of said path of uniform relatively small cylindrical cross section; and withdrawing grit substantially free of carbon black from the lower end of said path.

References Cited in the file of this patent

UNITED STATES PATENTS

| | | |
|---|---|---|
| 967,411 | Morscher | Aug. 16, 1910 |
| 1,146,624 | Huber | July 13, 1915 |
| 1,264,024 | Davis | Apr. 23, 1918 |
| 1,707,775 | Uhlinger | Apr. 2, 1929 |
| 2,618,533 | Bills | Nov. 18, 1952 |
| 2,729,330 | Newirth | Jan. 3, 1956 |

FOREIGN PATENTS

| | | |
|---|---|---|
| 46,997 | Netherlands | Oct. 16, 1939 |